(No Model.)

W. F. MATTES.
PUMP.

No. 336,654. Patented Feb. 23, 1886.

Witnesses:
Norris A. Clark.
R. W. Bishop.

Inventor
William F. Mattes,
By R.S. & H. Lacey
Attorneys

UNITED STATES PATENT OFFICE.

WILLIAM F. MATTES, OF SCRANTON, PENNSYLVANIA.

PUMP.

SPECIFICATION forming part of Letters Patent No. 336,654, dated February 23, 1886.

Application filed September 14, 1885. Serial No. 177,091. (No model.)

*To all whom it may concern:*

Be it known that I, WILLIAM F. MATTES, a citizen of the United States, residing at Scranton, in the county of Lackawanna and State of Pennsylvania, have invented certain new and useful Improvements in Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object to furnish a pump which will do more and better work with less power than can be done by pumps of ordinary construction.

Figure 1:
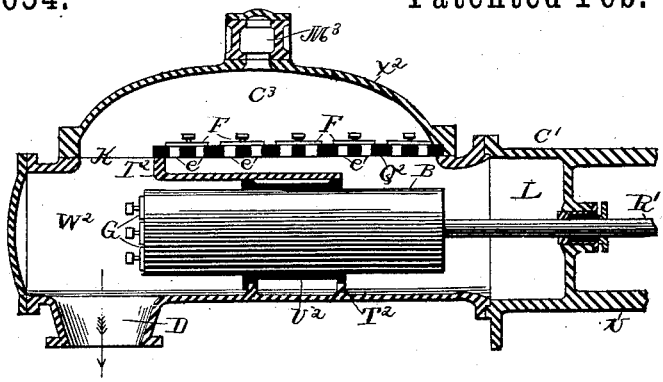
Figure 2:
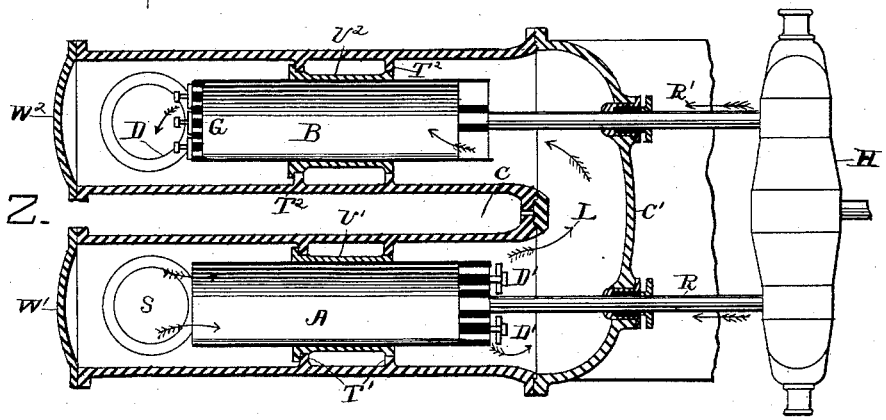
Figure 3:
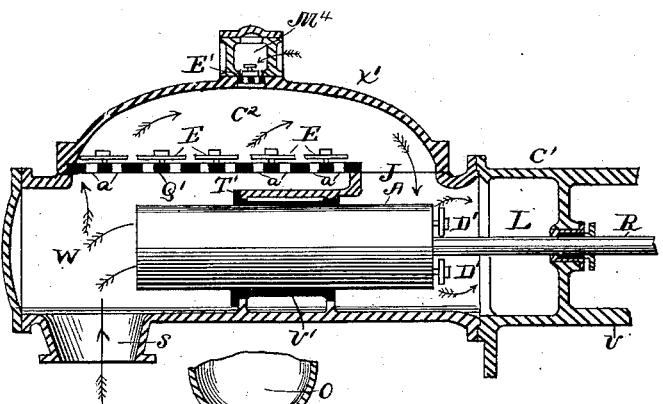
Figure 4:
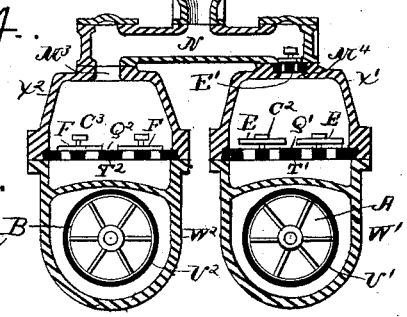

In the drawings, Figure 1 is a longitudinal vertical section on the line X X of Fig. 2, the plunger being shown in a side elevation. Fig. 2 is a longitudinal horizontal section on the line Y Y, Figs. 1 and 3. Fig. 3 is a longitudinal vertical section on the line Z Z, Fig. 2, the plunger being shown in side elevation. Fig. 4 is a vertical cross-section on lines P P, Figs. 1 and 3.

In carrying out my invention, I employ two casings or barrels, $W'$ $W^2$, having their outer ends closed by suitable caps. They are arranged near to each other, and have their adjacent sides united together, as shown at C. Over the inner open ends an end cap or casing, $C'$, is placed and snugly jointed, so as to provide a water-passage, L, between them. Casing $W'$ has a water-inlet port, S, and casing $W^2$ has an outlet-port, D. Each casing has an opening through its upper side. A valve-plate, $Q'$, is placed in and partially closes this opening in casing $W'$, and valve-plate $Q^2$ is arranged in and partially closes the corresponding opening in casing $W^2$. The valve-plate $Q'$ has its rear end abutted close against the casing, while between its forward end and the casing a water-passage, J, is provided. The valve-plate $Q'$ is provided with the valve E, to regulate the flow of water through the valve-openings $a$ formed therein. The valve-plate $Q^2$ is provided with valve-openings $e$, closed by valves F. This plate is arranged so that a water-passage, K, is at its rear end instead of at the front end, as with plate $Q'$.

The valve-plates $Q'$ $Q^2$ and the openings or passages J K are covered by domes or caps $X'$ $X^2$, whereby valve-chambers $C^2$ $C^3$ are formed. Through the top of the domes $X'$ $X^2$ passages $M^3$ $M^4$ are provided and connected by a cross-pipe, N. The passage $M^4$ has a valve, $E'$, located therein, which must necessarily open upward, as the space within the chamber $C^2$ is alternately under compression and suction, thereby preventing air being drawn into said space from the air-vessel O, whereas the air-space within chamber $C^3$ is at all times under compression, and the passage $m^3$, leading thereto from the pipe N, must remain open and be unobstructed, as shown in Figs. 1 and 4.

At or near the middle of the cross-pipe N an air-chamber, O, is arranged. This air-chamber conveniently cushions both pumps and prevents the accumulation of air in the valve-chambers $C^2$ $C^3$.

Diaphragms $T'$ $T^2$ are arranged within the barrels or casings $W'$ $W^2$. They are made integral with the barrels or casings, and they are bored through to receive and hold the sleeves $U'$ $U^2$. They serve as ties to hold the flat opposite sides of the casings together. They also support the valve-plates $Q'$ $Q^2$, and permit the extension of said plates past the middle point over the sleeves $U'$ $U^2$ as far as may be necessary to make effective areas of the valve-openings provided therein equal to the passages J and K.

The hollow plungers or pistons A and B are supported in the sleeves $U'$ $U^2$, and are provided with piston-rods R $R'$ and a cross-head, H, which is operated by a well-known mechanism, whereby the pistons are given a simultaneous movement. The piston A is provided with valves $D'$ at its forward end, and the piston B has valves G at its rear end.

The arrows which are alongside of the piston-rods R $R'$ are to indicate that the pistons are being driven toward the rear ends of the barrels, and the valves G in the plunger or piston B and the main valves F are closed. The water is flowing out at the exit-port D, and a fresh supply is being drawn through the inlet-port S, hollow piston A, valves D and E, and passage L. The outward stroke being completed, the return-stroke closes the valves $D'$ and E, the head of the piston A forces the water before it and through the passage L and through the now open valves F and G, and into the chamber at the rear end of the piston B. By the reciprocatory movement of the piston a continuous current of water is preserved. The velocity of the current is of course least at the instant of the change of the stroke; but this lessening of velocity is less apparent than in ordinary pumps. At the moment of change of stroke the force is always sufficiently powerful to cause a violent shock if suddenly interrupted. Therefore the work which the engine is called upon to do is, in addition to overcoming the static pressure, to accelerate a current already established, and not to overcome the inertia of the body of water at rest. In my device the strength of this current is sufficient, under favorable circumstances, to more than overcome the usual loss backward through the valves, technically known as "slip."

It will be seen that the passage L is formed by the cap C', which may also form the bed-plate of an engine, the side extension plates, V, being shown partly broken away. This reduces the cost of construction and permits an interchange of the two pump-barrels W' W², so that the suction-port D may be placed on either side of the engine, as desired.

This invention is an improvement upon the pumping-engines now in use, in the following particulars: First, it lessens materially the loss of power which occurs at each stroke of the ordinary engine by the acceleration of a body of water from a state of rest or confused agitation to the maximum piston-speed; second, it permits the use of higher piston-speed and greater number of strokes per minute before the loss of power above mentioned or the usual shock and slamming of valves is encountered—hence an engine of a given size will develop greater capacity; third, with a given number and size of valves the effective valve-area is doubled as compared with the ordinary acting pump, or, conversely, with a given effective area the necessary number of valves is reduced to one-half; fourth, it permits the valves to be placed in more accessible positions, and the size of the valve-plate is greatly increased without interfering with convenience of access or embarrassing the design; fifth, it permits a much more convenient location of suction and delivery pipes and frees the valve-chest from all connection with the latter.

Having thus described my invention, what I claim, and desire to secure by Letters Patent, is—

1. The combination, with the casing provided with a water-port, diaphragms located within the same and forming an integral part thereof, a sleeve held within the diaphragms, the plunger working in and supported by the diaphragms, a third diaphragm integrally formed with the casing and located above the sleeve in the plane of its bore, and a valve-plate and valves arranged above the latter diaphragm, substantially as shown, and for the purposes set forth.

2. The combination of the casings, having direct communication with each other, plungers working therein, apertured dome-shaped caps inclosing one side of the casings and forming chambers to one side of each casing, a cross-pipe connecting the apertures of the caps and communicating with the chambers, an air-chamber connected with the cross-pipes and a check-valve located within the cross-pipe between the air-vessel and the chamber inclosed by one of the dome-shaped caps, as and for the purposes set forth.

In testimony whereof I affix my signature in presence of two witnesses.

WILLIAM F. MATTES.

Witnesses:
R. W. OLMSTEAD,
JAMES S. MOTT.